US011562593B2

(12) United States Patent
Li et al.

(10) Patent No.: US 11,562,593 B2
(45) Date of Patent: Jan. 24, 2023

(54) CONSTRUCTING A COMPUTER-IMPLEMENTED SEMANTIC DOCUMENT (71) Applicant: Microsoft Technology Licensing, LLC, Redmond, WA (US)

(72) Inventors: Ziliu Li, Sammamish, WA (US); Junaid Ahmed, Bellevue, WA (US); Kwok Fung Tang, Bellevue, WA (US); Arnold Overwijk, Redmond, WA (US); Jue Wang, Bellevue, WA (US); Charumathi Lakshmanan, Bellevue, WA (US); Arindam Mitra, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/888,554

(22) Filed: May 29, 2020

(65) Prior Publication Data
US 2021/0374398 A1 Dec. 2, 2021

(51) Int. Cl.
*G06V 30/416* (2022.01)
*G06F 40/263* (2020.01)
(Continued)

(52) U.S. Cl.
CPC .......... *G06V 30/416* (2022.01); *G06F 40/263* (2020.01); *G06F 40/30* (2020.01);
(Continued)

(58) Field of Classification Search
CPC ........... G06K 9/00469; G06K 9/00463; G06K 9/6217; G06K 9/46; G06K 9/2063; G06F 40/263; G06F 40/143
(Continued)

(56) References Cited

U.S. PATENT DOCUMENTS 5,848,184 A * 12/1998 Taylor ................ G06K 9/00463
382/173
5,848,191 A * 12/1998 Chen .................... G06K 9/6842
382/229

(Continued)

FOREIGN PATENT DOCUMENTS

CN 109685065 B * 6/2021 ........... G06K 9/3233

OTHER PUBLICATIONS

Geraldin Nanfack, Azeddine Elhassouny, Rachid Oulad Haj Thami, "SqueezeSegNet: a new fast deep convolutional neural network for semantic segmentation," Proc. SPIE 10696, Tenth International Conference on Machine Vision (ICMV 2017), 106962O (Apr. 13, 2018); doi: 10.1117/12.2309497 (Year: 2018).*
"International Search Report and Written Opinion issued in PCT Application No. PCT/US21/024754", dated Jun. 22, 2021, 11 Pages.

*Primary Examiner* — Stephen S Hong
*Assistant Examiner* — Broderick C Anderson
(74) *Attorney, Agent, or Firm* — Calfee, Halter & Griswold LLP (57) ABSTRACT

Technologies pertaining to electronic document understanding are described herein. A document is received, wherein the document includes a section of a type. An image of the document is generated, and a candidate region is identified in the image of the document, wherein the candidate region encompasses the section. A label is assigned to the candidate region based upon text of the section, wherein the label identifies the type of the section. An electronic document understanding task is performed based upon the label assigned to the candidate region.

20 Claims, 10 Drawing Sheets (51) Int. Cl.
  *G06F 40/30* (2020.01)
  *G06K 9/62* (2022.01)
  *G06V 10/40* (2022.01)
  *G06V 10/22* (2022.01)
  *G06V 30/414* (2022.01)
  *G06F 40/143* (2020.01)
(52) U.S. Cl.
  CPC ......... *G06K 9/6217* (2013.01); *G06V 10/225* (2022.01); *G06V 10/40* (2022.01); *G06V 30/414* (2022.01); *G06F 40/143* (2020.01)
(58) Field of Classification Search
  USPC ....................................................... 715/254
  See application file for complete search history.

(56) References Cited

U.S. PATENT DOCUMENTS

| | | | | |
|---|---|---|---|---|
| 6,167,369 | A * | 12/2000 | Schulze | G06F 40/284 |
| | | | | 704/9 |
| 6,694,053 | B1 * | 2/2004 | Burns | G06K 9/00469 |
| | | | | 382/176 |
| 9,514,216 | B2 * | 12/2016 | Duan | G06N 5/04 |
| 2002/0029232 | A1 | 3/2002 | Bobrow | |
| 2007/0081179 | A1 * | 4/2007 | Nishida | G06K 9/00469 |
| | | | | 358/1.11 |
| 2016/0364608 | A1 * | 12/2016 | Sengupta | G06F 16/345 |
| 2017/0278514 | A1 * | 9/2017 | Mathias | G06F 16/35 |
| 2018/0089373 | A1 * | 3/2018 | Matsuguchi | G16B 25/10 |
| 2018/0300315 | A1 * | 10/2018 | Leal | G06F 16/355 |
| 2019/0073354 | A1 * | 3/2019 | Indenbom | G06F 40/30 |
| 2019/0102362 | A1 * | 4/2019 | Orciuoli | G06F 16/957 |

* cited by examiner

CONSTRUCTING A COMPUTER-IMPLEMENTED SEMANTIC DOCUMENT

BACKGROUND

There are a relatively large number of electronic documents, of different types, that are readily accessible for review by people. For example, there are currently over 5 billion webpages indexed on the World Wide Web, wherein a person can access the webpages through use of a web browser. In addition, people and enterprises have documents retained in computer-readable storage, wherein such documents can be of various types (e.g., word processing documents, portable document format (PDF) documents, web pages, etc.) and can have a variety of different formats (e.g., title in the top center, title in the top right, different size fonts, and so forth).

Documents in general, and webpages in particular, tend to include many different sections of different type positioned in various locations throughout the documents. Exemplary types of sections can include, but are not limited to, a "page header", "primary content", a "Tooter", a "sidebar", a "section header", a "list", a "table", and so forth. Computer-implemented document understanding refers to a computing task that involves extracting semantically relevant text from documents that are included in different sections of the documents. Identifying sections from which to extract text may serve as a foundation to downstream tasks, wherein such downstream tasks can include assisting users with retrieving relevant documents, identifying instant answers to questions, constructing lists, and so forth.

Conventionally, at least with respect to webpages, HTML tags assigned to text of a webpage have been employed in connection with identifying different sections of the webpage. A problem with employing HTML tags to identify sections, however, is that HTML tags may be overly general, may be incorrectly used, or may be missing. For instance, an HTML tag may identify text as being included in a "title" when, in actuality, the text is included in a section heading. For documents, such as PDF documents, that include no metadata that explicitly identities section boundaries, there is currently no suitable approach for identifying different sections of the document, rendering it difficult to perform computer-implemented document understanding with respect to such document.

SUMMARY

The following is a brief summary of subject matter that is described in greater detail herein. This summary is not intended to be limiting as to the scope of the claims.

Described herein are various technologies pertaining to computer-implemented document understanding, wherein the technologies described herein are configured to identify different sections of documents, and further wherein the documents can be of arbitrary type and have various formats.

With more particularity, a computing system can receive a document, wherein the document may be a webpage, a word processing document, a portable document format (PDF) document, or the like. The computing system can render the document and generate an image of the rendered document. The computing system can then perform processing with respect to the image of the document; since the computing system processes the image of the document, a type of the document (e.g., webpage, word processing document, PDF document, etc.) can be arbitrary.

The computing system includes a first computer-implemented model that is configured to identify candidate regions in the image that correspond to sections of one or more types. For instance, exemplary section types can include "title", "header", "section header", "primary content", "list", "table", "footer" "sidebar", "advertisement", "related articles", amongst others. The first computer-implemented model may thus be a multiclass classifier that is trained based upon labeled images, wherein such images are labeled to identify boundaries of sections and types of such sections. In an example, the first computer-implemented model can be a fast recurrent convolutional neural network (fast R-CNN), although other types of computer implemented models are contemplated. The first computer-implemented model can identify the candidate regions in the image based upon the image itself and further optionally based upon text and layout features of the image that may be provided separately and/or extracted from the image. Text features may include, for example, text font, text size, text location, and so forth. Layout features may include relative locations of different sections in the image.

The first computer-implemented model can output candidate regions (e.g., bounding boxes that encompass portions of the image), wherein the candidate regions have scores for respective section types assigned thereto, and further wherein a score for a section type assigned to a candidate region indicates a likelihood (as computed by the computer-implemented model) that the candidate region encompasses a section of the section type. In an example, the computer-implemented model can identify a candidate region and can assign a first score of 0.8 to the section type "title" for the candidate region and can assign a second score of 0.1 to the section type "section header" for the candidate region. The first score indicates that the computer-implemented model has ascertained that there is a relatively high likelihood that the candidate region encompasses a title of the document, while the second score indicates that the computer-implemented model has ascertained that there is a relatively low likelihood that the candidate region encompasses a section header of the document.

In an exemplary embodiment, a second computer-implemented model can receive a candidate region output by the first computer-implemented model and can further receive features pertaining to text within the candidate region and optionally information from other candidate regions identified by the first computer-implemented model. The text within the candidate region may have been subjected to natural language processing (NLP) technologies, such that semantic information can be provided to the second computer-implemented model with respect to text within the candidate region. The second computer-implemented model can additionally receive the scores for the section types output by the first computer-implemented model. The second computer implemented model is configured to assign a label to the candidate region, wherein the label identifies a type of the section encompassed by the candidate region. The computer-implemented model thus outputs candidate regions that include text and/or images that are assigned labels that identify types of sections to which the text and/or images belong in the document, as well as locations of the candidate regions.

Optionally, post-processing can be undertaken with respect to the labeled candidate regions. The output of the second computer-implemented model is several candidate regions with labels assigned thereto; it can be ascertained, however, that the candidate regions may cover too large or too small of an area. For example, a heading may be mistakenly broken across multiple candidate regions due to the heading including several lines and further due to spacing between lines being relatively large. In such a case, the computing system can employ language models and heuristics to "stitch" the candidate regions together before outputting the entire (combined) candidate region as a heading. In another example, the second computer-implemented model can output a label for a region that identifies such region as a list, when in reality the region includes several lists. Post processing can be undertaken to identify the existence of the several lists in the region and such list can be broken apart.

The computing system can output a semantic document, wherein the semantic document includes text and/or images with labels assigned thereto that identifies the types of sections of the document that correspond to the text and/or images. Thereafter, processing can be undertaken based upon the semantic document, wherein such processing can include, for example, text summarization (where primary content in the document is summarized), language identification, snippet extraction, named entity recognition (in a particular type of section of a page), concept identification, key phrase extraction, and so forth.

The technologies described herein exhibit advantages over existing approaches for computer-implemented document understanding. For example, the technologies described herein can be employed to identify sections of different documents of different types and is not limited to a particular type of document (such as a webpage). In addition, the technologies described herein can assign labels to multiple sections of various types, thereby enabling custom processing to be undertaking on text and/or images that are assigned different labels.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies pertaining to electronic document understanding are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality at is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component", "module", and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something and is not intended to indicate a preference.

Described herein are various technologies pertaining to computer-implemented electronic document understanding. With more specificity, described herein are technologies related to assigning labels to different regions of an electronic document, wherein a label assigned to a region identifies a type of section (from amongst several possible types of section) encompassed by the region. Exemplary section types include: "header", "title", "section heading", "primary content", "related articles", "Tooter", "sidebar", "table", "list", "image", "advertisement", etc. Upon labels being assigned to respective regions of the electronic document, electronic document understanding processing can be undertaken over the electronic document, wherein such processing can include summarizing primary content of the electronic document, generating lists from content of the electronic document, identifying named entities in the electronic document, identifying a primary language in which text of the electronic document is written, identifying topics in primary content of the electronic document, etc.

Figure 1:
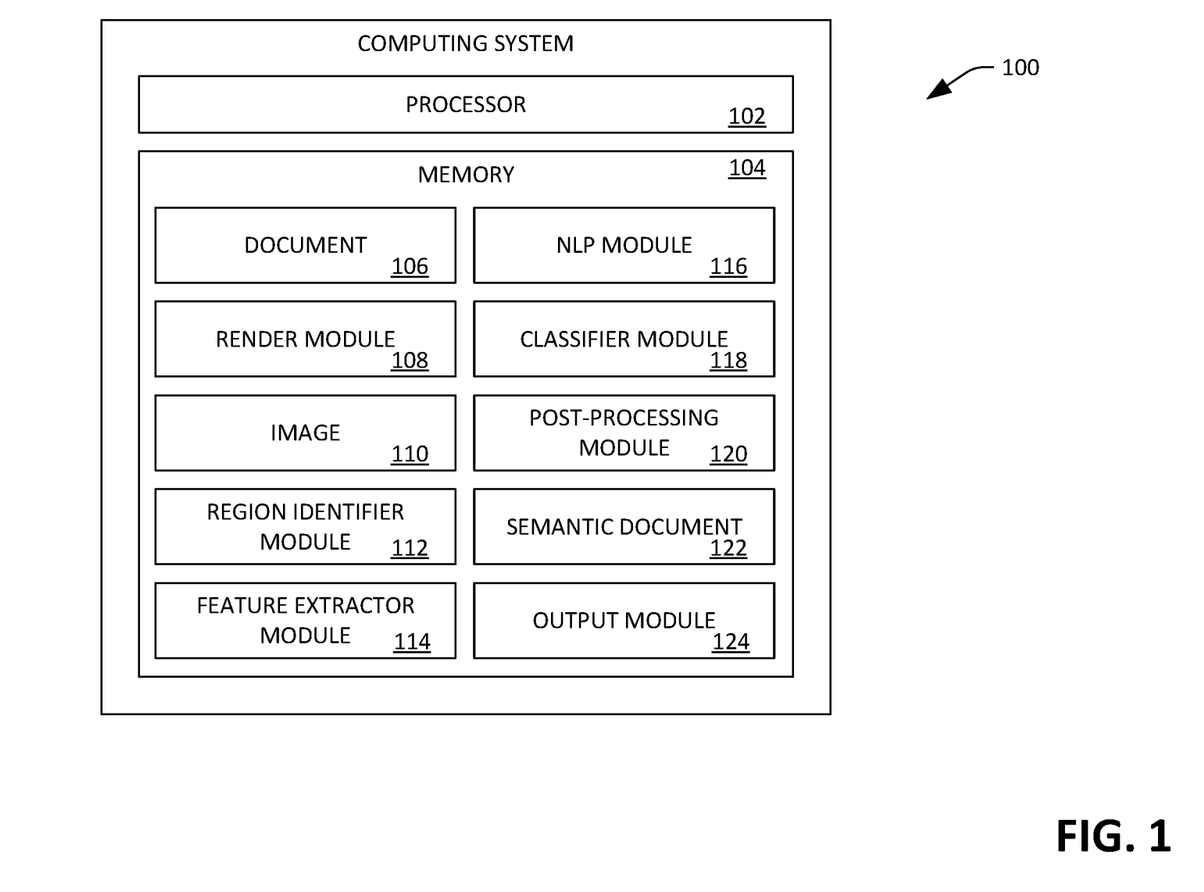
FIG. 1 is a functional block diagram of an exemplary computing system that is configured to assign labels to regions of a document, wherein the labels identify types of sections of such document.

With reference now to FIG. 1, a functional block diagram of an exemplary computing system 100 is illustrated, wherein the computing system 100 facilitates performance of computer-implemented electronic document understanding. The computing system 100 includes a processor 102 and memory 104, wherein the memory 104 can have modules loaded therein that are executed by the processor 102. The memory 104 has a document 106 loaded therein, wherein the document 106 may be a word processing document, a webpage, a portable document format (PDF) document, a slideshow document, or any other suitable type of electronic document.

The memory 104 further includes a render module 108 that is executed by the processor 102, wherein the render module 108 is configured to render the document 106 and output an image 110 of the document 106, wherein the image 110 is retained in the memory 104. Accordingly, the render module 108 can be or be included in a computer-implemented application that is configured to render the document 106. Thus, in an example, the render module 108 can be or be included in a web browser, a word processing application, a PDF reader application, etc. The image 110 may be saved in any suitable image file format, including but not limited to JPEG, GIF, PNG, BMP, TIFF, etc.

Figure 2:
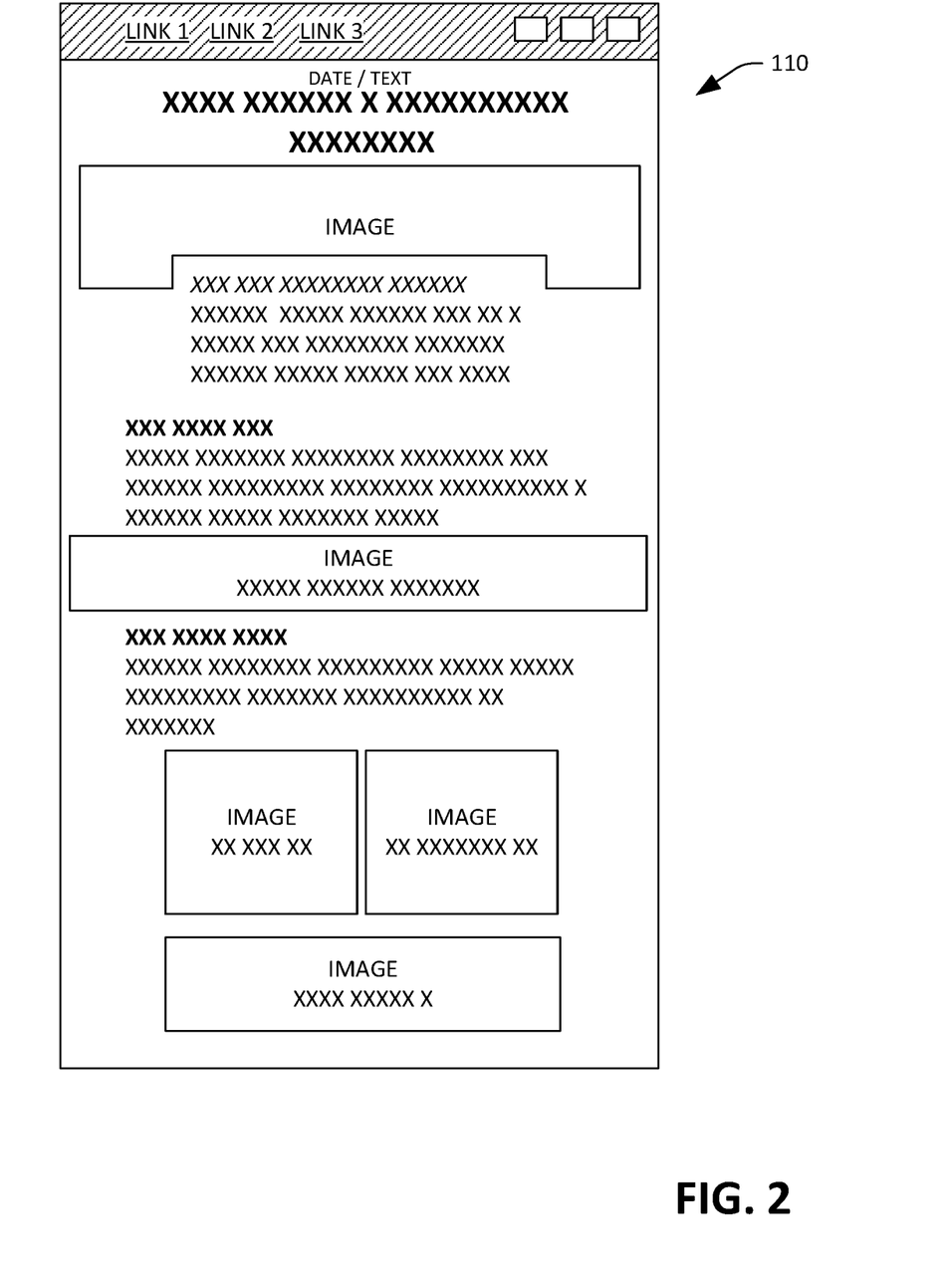
FIG. 2 is a schematic that depicts an image of a document, wherein the document includes several sections of different type.

Referring briefly to FIG. 2, an exemplary depiction of the image 110 is presented. In an example, the document 106 is a webpage and thus the image 110 depicts rendered content of the webpage. As can be ascertained, the document 106 includes hyperlinks, text of different font, text of differing size, text with different styling (some text is in bold, other text is underlined, other text has no styling), an image that includes no text, an image that includes text, optionally includes background coloring and graphics, optionally includes text and graphics in different colors, and so forth. As the render module 108 renders the document 106, such features are depicted in the exemplary image 110.

Returning to FIG. 1, the computing system 100 additionally includes a region identifier module 112 that is configured to receive the image 110 output by the render module 108 and is further configured to identify candidate regions in the image 110. A candidate region is a portion of the image 110 that the region identifier module 112 identifies as encompassing an individual section of the document 106. Therefore, the region identifier module 112 can identify multiple (potentially overlapping) candidate regions in the image 110.

The region identifier module 112, in an example, is a computer-implemented multiclass classifier that is configured to generate a plurality of bounding boxes with respect to portions of the image 110, wherein the bounding boxes define boundaries of the candidate regions. The region identifier module 112 assigns a plurality of scores to each candidate region, wherein each score corresponds to a section type that the region identifier module 112 is trained to identify. Thus, when the region identifier module 112 is trained to identify 10 different section types, the region identifier module 112 can assign 10 scores to each candidate region (one score for each section type). In a non-limiting example, the region identifier module 112 may be a type of deep neural network (DNN) such as, but not limited to a recurrent neural network (RNN), a convolutional neural network (CNN), a fast recurrent CNN (fast R-CNN), or other suitable type of computer-implemented multiclass classifier.

Figure 3:
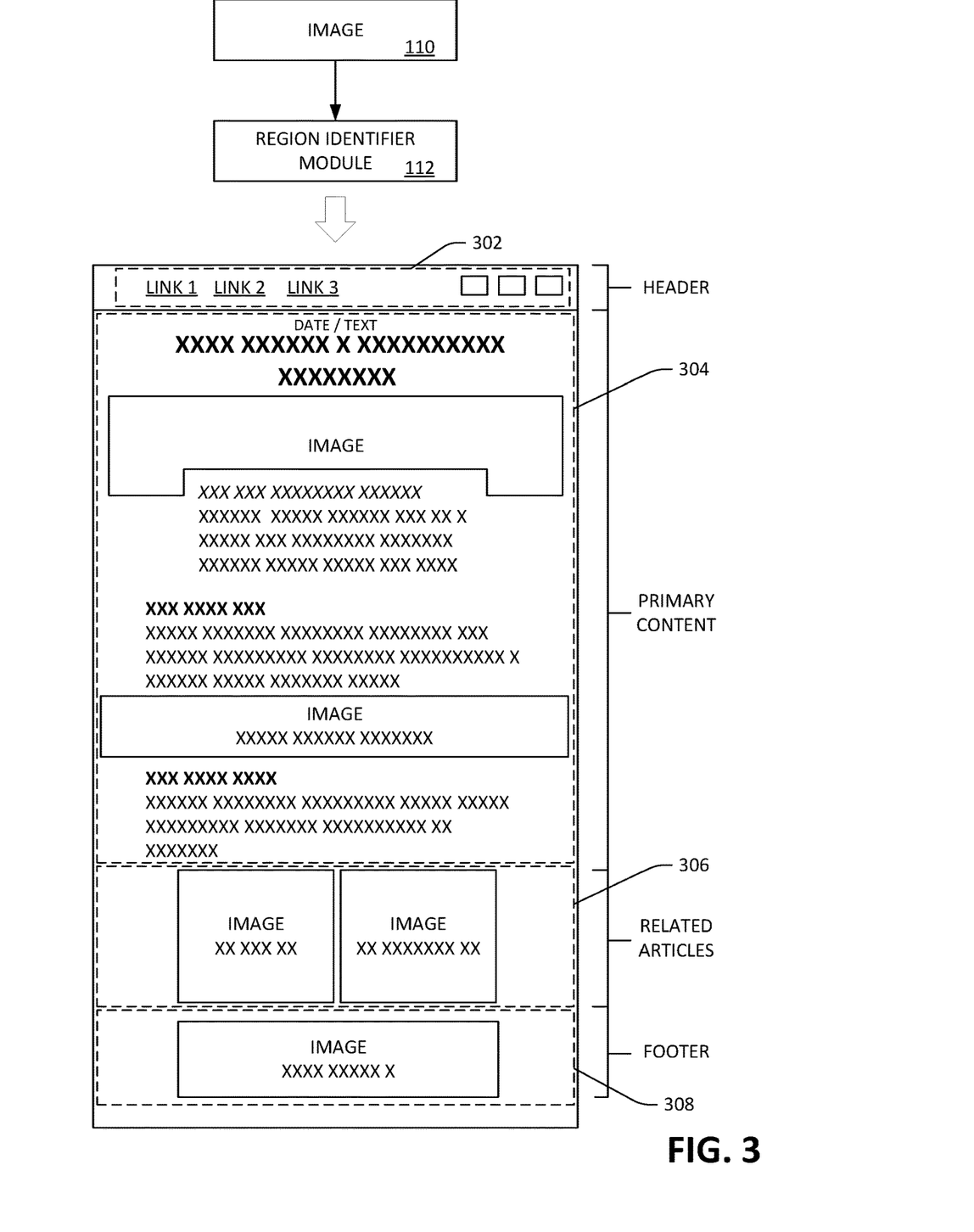
FIG. 3 is a functional block diagram that depicts exemplary operation of a computer-implemented module that is configured to identify candidate regions in a document.

Referring now to FIG. 3, a functional block diagram that illustrates exemplary operation of the region identifier module 112 is depicted. The region identifier module 112 receives the image 110 of the document 106 as rendered by the render module 108. Based upon the image 110 (e.g., values of pixels of the image 110) and optionally based upon text and/or layout features extracted from the image 110, the region identifier module 112 outputs (potentially overlapping) candidate regions 302-308 that are identified by the region identifier module 112 as encompassing different sections of the document 106, and further wherein the candidate regions 302-308 encompass text and/or images in the image 110. For example, the first candidate region 302 encompasses a plurality of hyperlinks as well as several buttons; the second candidate region 304 encompasses text and images; the third candidate region 306 encompasses images that include text; and the fourth candidate region 308 encompasses an image that includes text.

As indicated previously, the region identifier module 112 is further configured to assign several scores to each of the candidate regions 302-308, wherein each score assigned to a candidate region corresponds to a section type. For example, the first candidate region 302 may be assigned several scores, including a first score for the label "header", a second score for the label "primary content", a third score for the label "related articles", and a fourth score for the label "footer". A score for a label is representative of a confidence of the region identifier module 112 that the candidate region to which the score is assigned encompasses a section of the type identified by the label. Therefore, continuing with the example with respect to the first candidate region 302, the region identifier module 112 can assign a relatively high score for the label "header" (indicating that the region identifier module 112 is relatively highly confident that the first candidate region 302 encompasses a header of the document 106); additionally, the region identifier module 112 can assign a relatively low score for the label "primary content" (indicating that the region identifier module 112 has low confidence that the first candidate region 302 encompasses primary content of the document).

In the example depicted in FIG. 3, the first candidate region 302 has a highest score assigned for the label "header", the second candidate region 304 has a highest score assigned for the label "primary content", the third candidate region 306 has the highest score assigned for the label "related articles", and the forth candidate region 308 has a highest score assigned for the label "footer".

Figure 4:
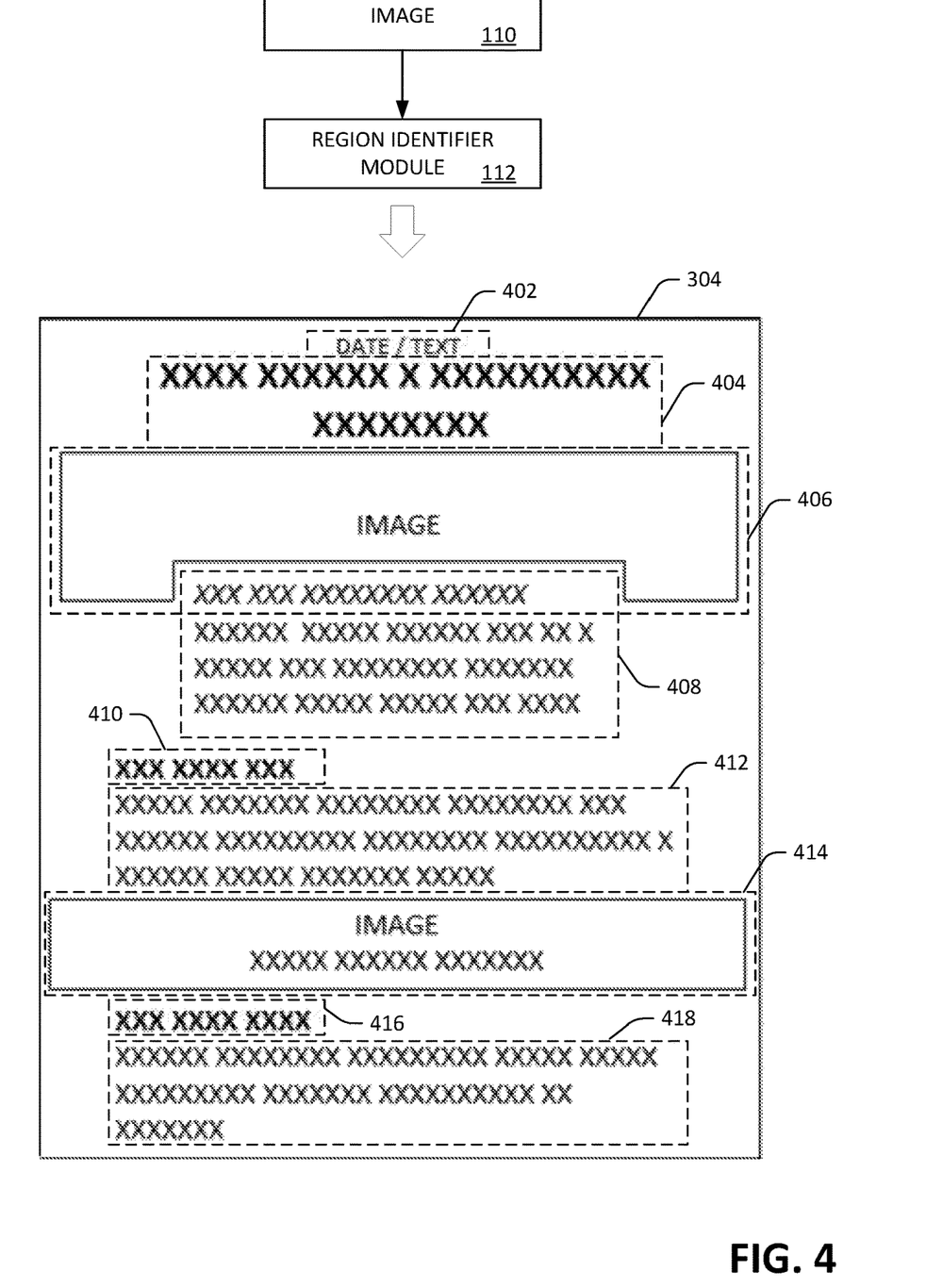
FIG. 4 is a functional block diagram that depicts further exemplary operation of the computer-implemented module that is configured to identify candidate regions in a document.

Referring now to FIG. 4, another functional block diagram depicting further operation of the region identifier module 112 is illustrated. As noted previously, the region identifier module 112 can identify candidate regions that are partially or entirely overlapping, and thus the region identifier module 112 can assign hierarchical labels to candidate regions. For instance, the region identifier module 112 identified the second candidate region 304, and further assigned a relatively high score for the label "primary content" to the second candidate region 304. The region identifier module 112 can further identify several candidate regions 402-418 that are within the second candidate region 304. The region identifier module 112 can identify the candidate regions 402-418 based upon the image 110 of the document 106 (e.g., values of pixels of the image 110) and further optionally based on layout information and/or text extracted from the image 110 (wherein the text is included in the candidate regions 402-418).

In an example, the region identifier module 112 can: assign the fifth candidate region 402 a relatively high score for the label "publication date"; assign the sixth candidate region 404 a relatively high score for the label "title"; assign the seventh candidate region 406 a relatively high score for the label "image"; assign the eighth candidate region 408 a relatively high score for the label "body text"; assign the ninth candidate region 410 a relatively high score for the label "section header"; assign the tenth candidate region 412 a relatively high score for the label "body text"; assign the eleventh candidate region 414 a relatively high score for the label "advertisement"; assign the twelfth candidate region 416 a relatively high score for the label "section heading"; and assign the thirteenth candidate region 418 a relatively high score for the label "body text". Hence, the region identifier module 112 can assign hierarchical scores and/or labels to candidate regions, as the sixth candidate region 404 can be assigned a score for the label "primary content" (as the sixth candidate region 404 is encompassed by the second candidate region 304) and can further be assigned a score for the label "title". As with the candidate regions 302-308, each of the candidate regions 402-418 can be assigned multiple scores for respective labels.

The region identifier module 112 can be trained based upon documents that are programmatically generated (where portions of a document have section labels programmatically assigned thereto), and can be further trained based upon human-labeled documents (where humans manually assign section labels to portions of the document). For instance, a document generation system (not shown) can employ various rules to generate documents having different formats with automatically generated titles, body text, etc. The region identifier module 112 can be initially trained based upon the programmatically generated and labeled documents, and the region identifier module 112 can be subsequently trained based upon the human-labeled documents.

Returning again to FIG. 1, the memory 104 further comprises a feature extractor module 114 that is configured to extract values for features of text and/or images for each of the candidate regions identified by the region identifier module 112. With respect to a candidate region, the feature extractor module 114 can be configured to extract values for one or more of the following features: location of the candidate region (X, Y coordinates that define boundaries of the candidate region), text included in the candidate region, font of text included in the candidate region, size of text included in the candidate region, styling of text included in the candidate region (e.g. bold, underline, etc.), relative position between the candidate region and at least one other candidate region identified by the region identifier module 112, identities of HTML tags assigned to text in the candidate region, anchor text in the candidate region, and so forth.

Figure 5:
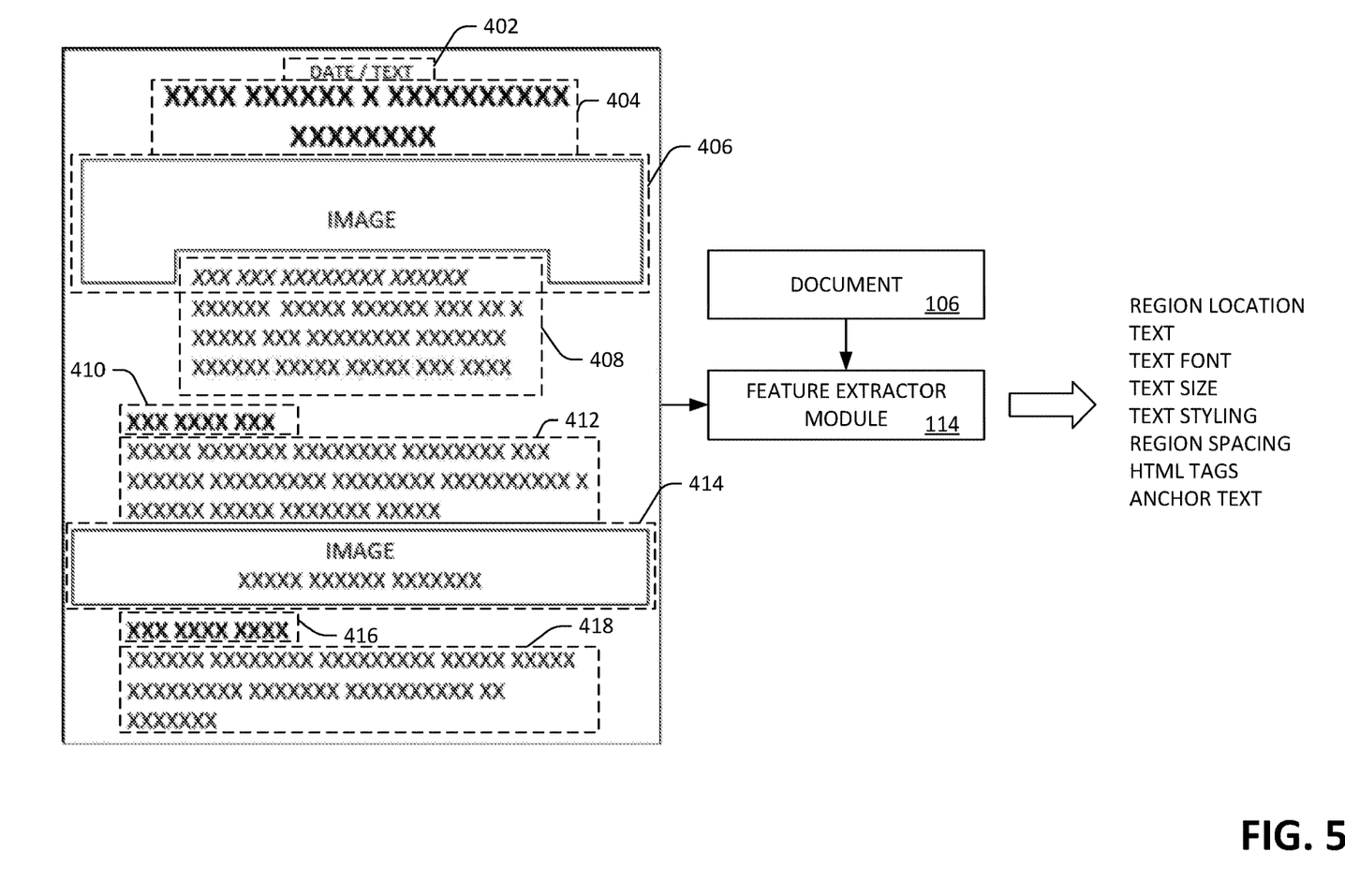
FIG. 5 is a functional block diagram that depicts exemplary operation of a module that is configured to extract features from a document and/or an image of the document.

Referring to FIG. 5, a functional block diagram that depicts exemplary operation of the feature extractor module 114 is illustrated. As indicated previously, the feature extractor module 114 can extract values for features with respect to each of the candidate regions identified by the region identifier module 112. Thus, in an example, the feature extractor module 114 can receive content included in the tenth candidate region 412 and can extract values for features from such content (exemplary features have been presented above). When the page document 106 is a webpage, HTML tags assigned to the text encompassed by the tenth candidate region 412, an identity of any hyperlinks in the candidate region 412, etc. can be received from the document 106 (rather than from the image 110). Similarly, when the document 106 is a webpage or other suitable open text document, the feature extractor module 114 can additionally receive the document 106 itself and can extract text that is included in the document 106. When the document 106 is a PDF document (or other type of document from which text cannot readily be extracted), the feature extractor module 114 can employ optical character recognition (OCR) technology to extract values for one or more of the features referenced above. It can thus be ascertained that the feature extractor module 114 outputs values for features for each of the candidate regions identified by the region identifier module 112.

Returning again to FIG. 1, the memory 104 additionally includes a natural language processing (NLP) module 116, wherein the NLP module 116 is configured to receive, for each of the candidate regions identified by the region identifier module 112, text extracted therefrom by the feature extractor module 114.

Figure 6:
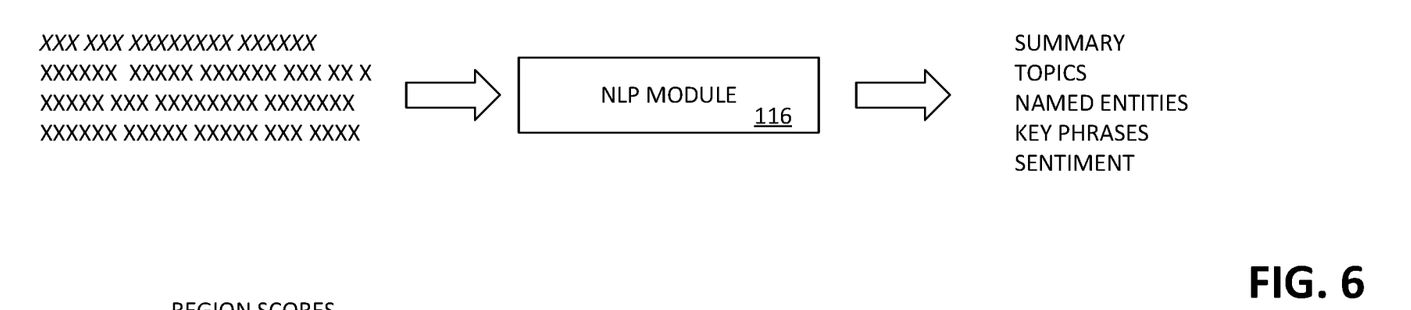
FIG. 6 is a functional block diagram that depicts exemplary operation of a natural language processing (NLP) module that is configured to identify semantic information in text of a candidate region of an image.

With reference to FIG. 6, a functional block diagram that illustrates exemplary operation of the NLP module 116 is presented. In the example depicted in FIG. 6, the NLP module 116 receives text extracted by the feature extractor module 114 that is included in the eighth candidate region 408 (illustrated in FIGS. 4 and 5). The NLP module 116 can utilize any suitable NLP technologies to output semantic features for such text, including but not limited to a summary of the text, one or more topics referenced in the text, named entities extracted from the text, key phrases included in the text, a sentiment of the text, and/or other suitable semantic information. Again, the NLP module 116 can output such information for each candidate region that includes text (including text in images of the document 106).

Returning again to FIG. 1, the memory 104 also includes a classifier module 116 that is configured to receive, for each candidate region identified by the region identifier module 112, values for features of the candidate region as output by the feature extractor module 114 and semantic information corresponding to the candidate region as output by the NLP module 116. The classifier module 118 can then assign a label (final label) to the candidate region based upon such received information, wherein the label identifies a type of section of the document 106 that is encompassed by the candidate region. The classifier module 118 is therefore a multiclass classifier, wherein such multiclass classifier can be any suitable type of classifier, including but not limited to a DNN, a CNN, an RNN, a combination thereof, or the like.

Figure 7:
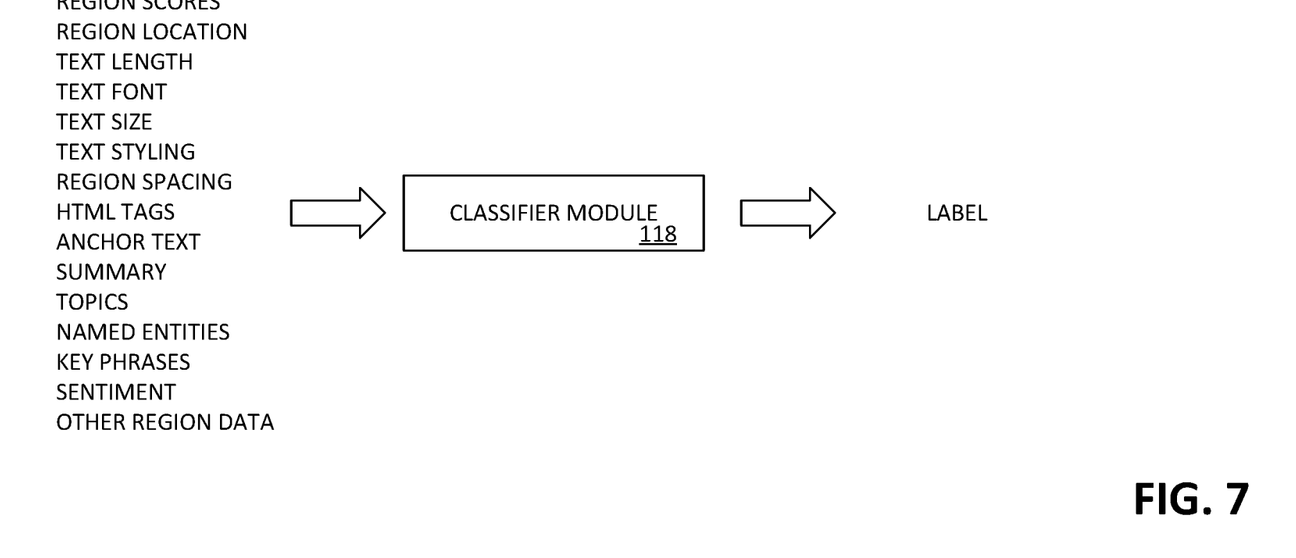
FIG. 7 is a functional block diagram of an exemplary classifier module that is configured to assign a label to a candidate region, wherein the label identifies a type of section of a document encompassed by the candidate region.

Referring now to FIG. 7, a functional block diagram depicting exemplary operation of the classifier module 118 is presented. The classifier module 118 receives, for a candidate region output by the region identifier module 112, values for features extracted from the image 110 by the feature extractor module 114 and/or content extracted from the document 106 by the feature extractor module 114, including but not limited to scores assigned by the region identifier module 112 to candidate regions for labels, a location of the candidate region in the image 110, a volume (length) of text in the candidate region, a font of text in the candidate region, a size of text in the candidate region, styling of text in the candidate region, spacing between the candidate and other candidate regions identified by the region identifier module 112, HTML tags in the document 106 that correspond to text included in the candidate region, anchor text in the document 106 that is included in the candidate region, etc. Additionally, the classifier module 118 receives output of the NLP module 116 with respect to content in the candidate region, wherein the output of the NLP module 116 includes but is not limited to topics referenced in the text encompassed by the candidate region, entities extracted from the text encompassed by the candidate region, key phrases included in text encompassed by the candidate region, sentiment of text encompassed by the candidate region, etc.

Moreover, the classifier module 118 can receive such information for other candidate regions (e.g., candidate regions that are either horizontally or vertically adjacent to the candidate region) identified by the region identifier module 112. More specifically, the classifier module 118, with respect to a first candidate region to which the classifier module 118 is to assign a label, can receive an identity of a second candidate region identified by the region identifier module 112, a location of the second candidate region relative to the first candidate region, values for features extracted for the second candidate region by the feature extractor module 114, and semantic information for text encompassed by the second candidate region (as output by the NLP module 116).

With respect to the first candidate region, the classifier module 118 can receive information about several other candidate regions when assigning a label to the first candidate region. It can be ascertained that the classifier module 118 can assign a label to each of the candidate regions output by the region identifier module 112, wherein the labels can either identify types of sections in the document 106 or indicate that the candidate region does not encompass a section type of interest.

Returning again to FIG. 1, the memory 104 also optionally includes a post processing module 120 that receives the labels assigned to the candidate regions by the classifier module 118 in the rendered image 110. It is possible that a candidate region in the candidate regions may cover too large or too small of an area. For example, a section header may be mistakenly separated across multiple candidate regions due to line spacing; the post processing module 120 can include language models and/or apply heuristics to "stitch" the candidate regions together, thereby combining two separate candidate regions into a single candidate region that is assigned the label "section header". In another example, the classifier module 118 can assign a label to a candidate region that indicates that the candidate region encompasses a "list"; in actuality, however, the candidate region may encompass several lists. The post processing module 120 can employ NLP technologies and/or heuristics to break apart the candidate region into multiple candidate regions, each of which includes its own list. The classifier module 118 or the post processing module 120 can output a semantic document 122, wherein the semantic document 122 comprises content text and/or images) that is assigned labels that identify a type of section that includes the text or images.

Figure 8:
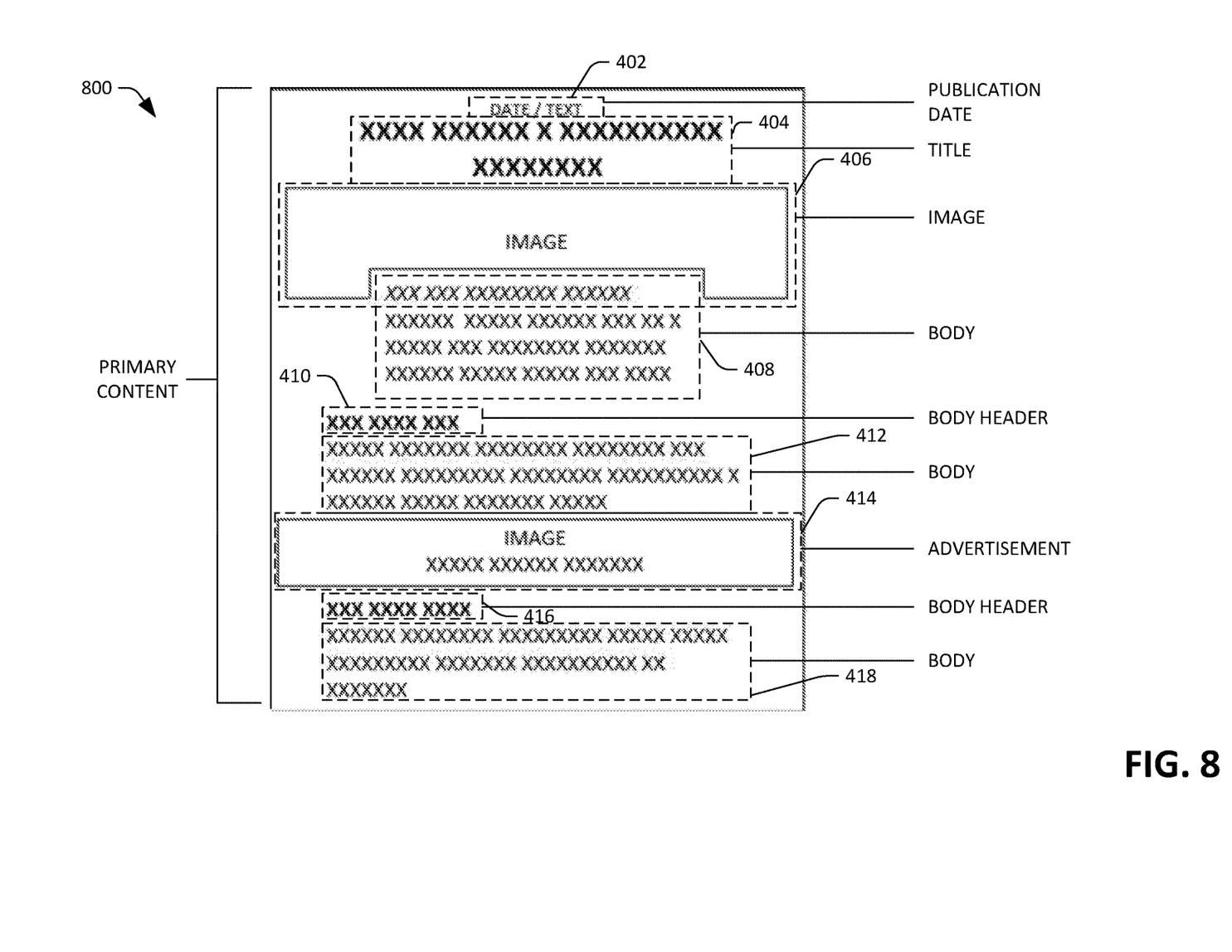
FIG. 8 is a schematic that depicts a portion of a document with labels assigned thereto.

Referring to FIG. 8, an exemplary semantic document 800 is illustrated. The semantic document 800 includes content encompassed by the second candidate region 304 assigned the label "primary content" by the classifier module 118 and/or the postprocessing module 120. Additionally, the semantic document 800 includes content respectively encompassed by the candidate regions 402-418, wherein such content is assigned respective labels of, for example, "publication date", "title", "image", "body", "body header", "body", "advertisement", "body header", and "body". While not illustrated, the semantic document 800 may also include labels assigned to content encompassed by the candidate regions 302, 306, and 308.

Returning to Fig. 1, the memory 104 may also include an output module 124 that receives the semantic document 122 and generates an output based upon such semantic page. For example, the output module 124 can perform a task related to electronic document understanding with respect to the semantic document 122, wherein such task can include, but is not limited to, including but not limited to, text summarization, list construction, primary language identification, etc.

For instance, the text encompassed by the candidate regions 410 and 416 (labeled "body header") may be well-suited for inclusion in a list, and the output module 124 can generate a list that includes the text from the regions 410 and 416 (where the list does not include the "body" text underneath such headers). For example, the document 106 may present information about hotels in a city, wherein the text in the region 410 identifies a name of a first hotel, text in the region 412 identifies features of the first hotel, text in the region 416 identifies a name of a second hotel, and text in the region 418 identifies features of the second hotel. The output module 124 can generate a list of the hotel names based upon the label "body header" that is assigned to the regions 410 and 416, and such list can be retained by a search engine. Thus, when an individual sets forth the query "best hotels in the city" to the search engine, the search engine can return the list constructed by the output module 124 as an instant answer to the querier. The output module 124 can perform various tasks, including identifying language of body text, extracting snippets from the document 106 based upon labels assigned to content of the document 106, generating a summary of primary content of the document 106, extracting named entities from the document 106 based upon labels assigned to content in the document 106 by the classifier module 118, and so forth.

Figure 9:
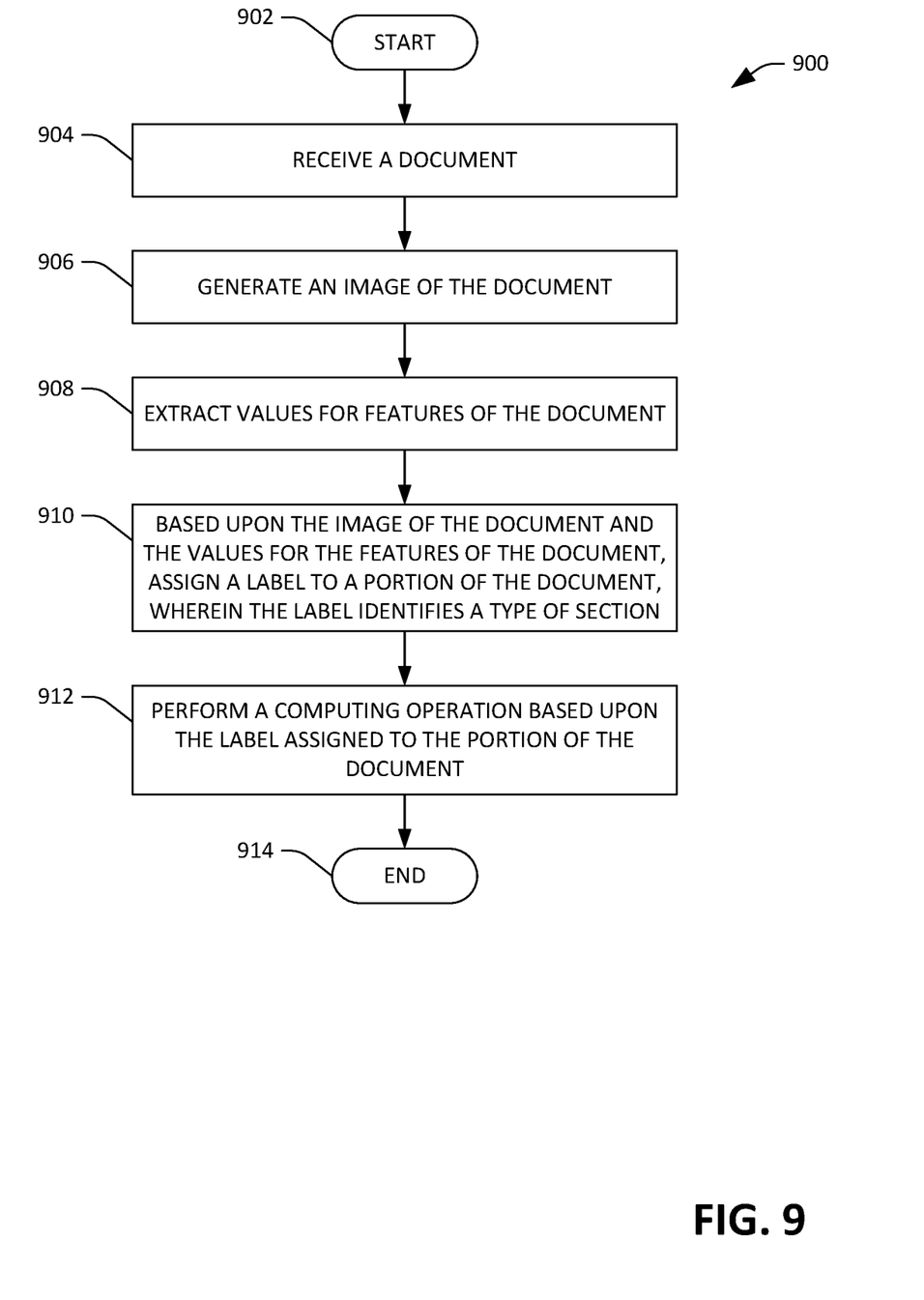
FIG. 9 is a flow diagram illustrating an exemplary methodology for assigning labels to regions of a page and subsequently performing a computing operation based upon the labels assigned to the regions of the page.
Figure 10:
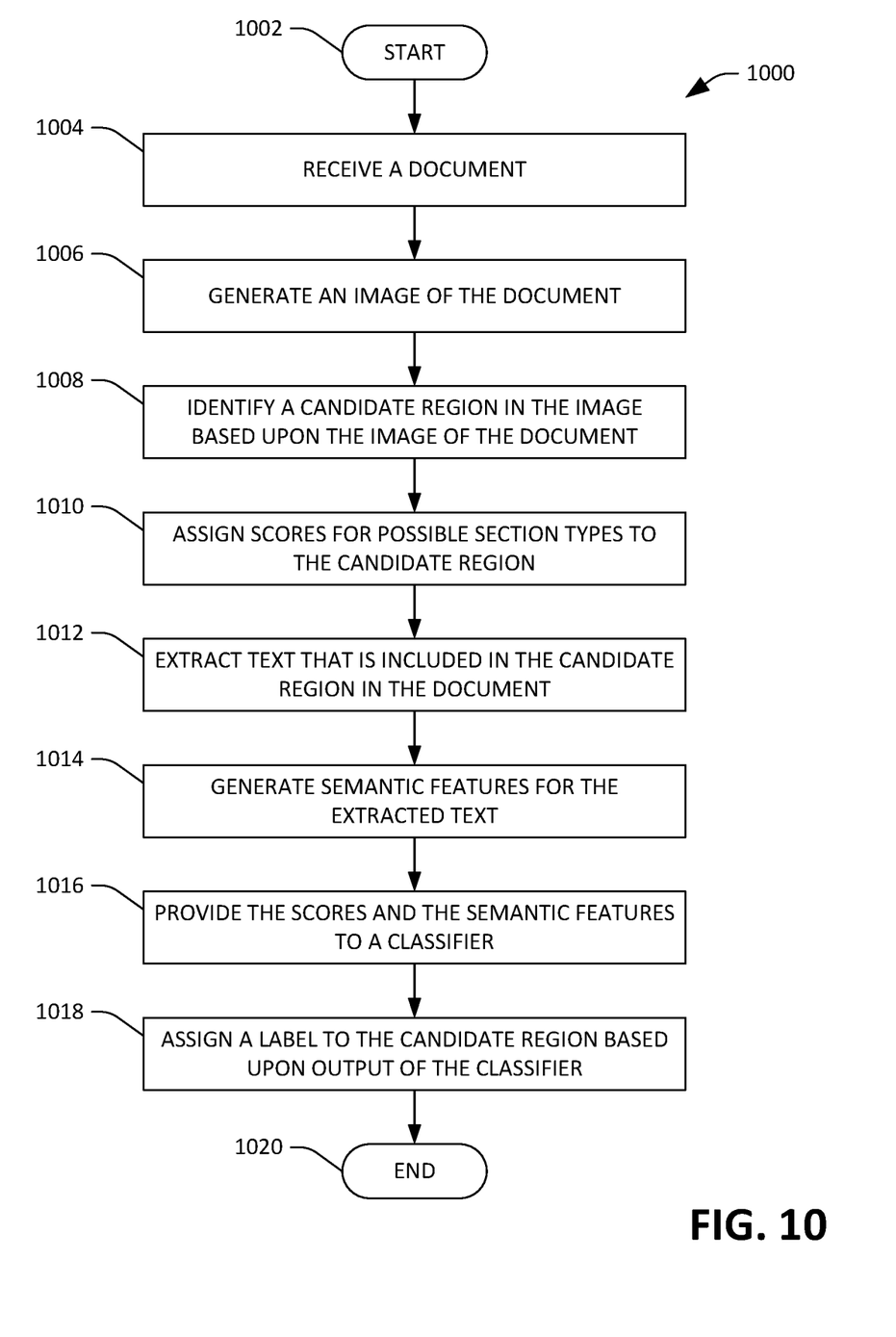
FIG. 10 is a flow diagram illustrating an exemplary methodology for assigning a label to a candidate region based upon output of a multi-class classifier.

FIGS. 9 and 10 illustrate exemplary methodologies relating to electronic document understanding. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Now referring solely to FIG. 9, a flow diagram illustrating an exemplary methodology 900 for performing a computing operation based upon a label assigned to a portion of a document is illustrated. The methodology 900 starts at 902, and at 904 a document is received. For example, the document may be a webpage. At 906, an image of the webpage is generated. For instance, the webpage may be rendered by a web browser and an image of the rendered webpage can be generated. At 908, values for features of content of the document are extracted from the image of the document. At 91,0 based upon the image of the document and the values for features of the document, a label is assigned to a portion of the document, wherein the label identifies a type of section that corresponds to the portion of the document. At 912, a computing operation is performed based upon the label assigned to the portion of the document. The methodology 900 completes at 914.

Turning now to FIG. 10, a flow diagram illustrating an exemplary methodology 1000 for assigning a label to a candidate region in an image of a document is illustrated. The methodology 1000 starts at 1002, and at 1004 a document is received. As indicated previously, the document may be a webpage, a word processing document, a slideshow document, a PDF document, or the like. At 1006, an image of the document is generated, and at 1008 a candidate region in the document is identified based upon the image of the document. For instance, a DNN can be trained to identify candidate regions in images of documents.

At 1010, scores for possible section types are assigned to the candidate region. More specifically, a probability distribution over section types is assigned to the candidate region. At 1012, text that is included in the candidate region is extracted from the document, and at 1014 semantic features for the extracted text are generated. At 1016 the scores and the semantic features are provided to a classifier, and at 1018 a label is assigned to the candidate region based upon output of the classifier. The methodology 1000 can return to 1008 such that the processing can repeat for several candidate regions in the image of the document. The methodology completes at 1020.

Figure 11:
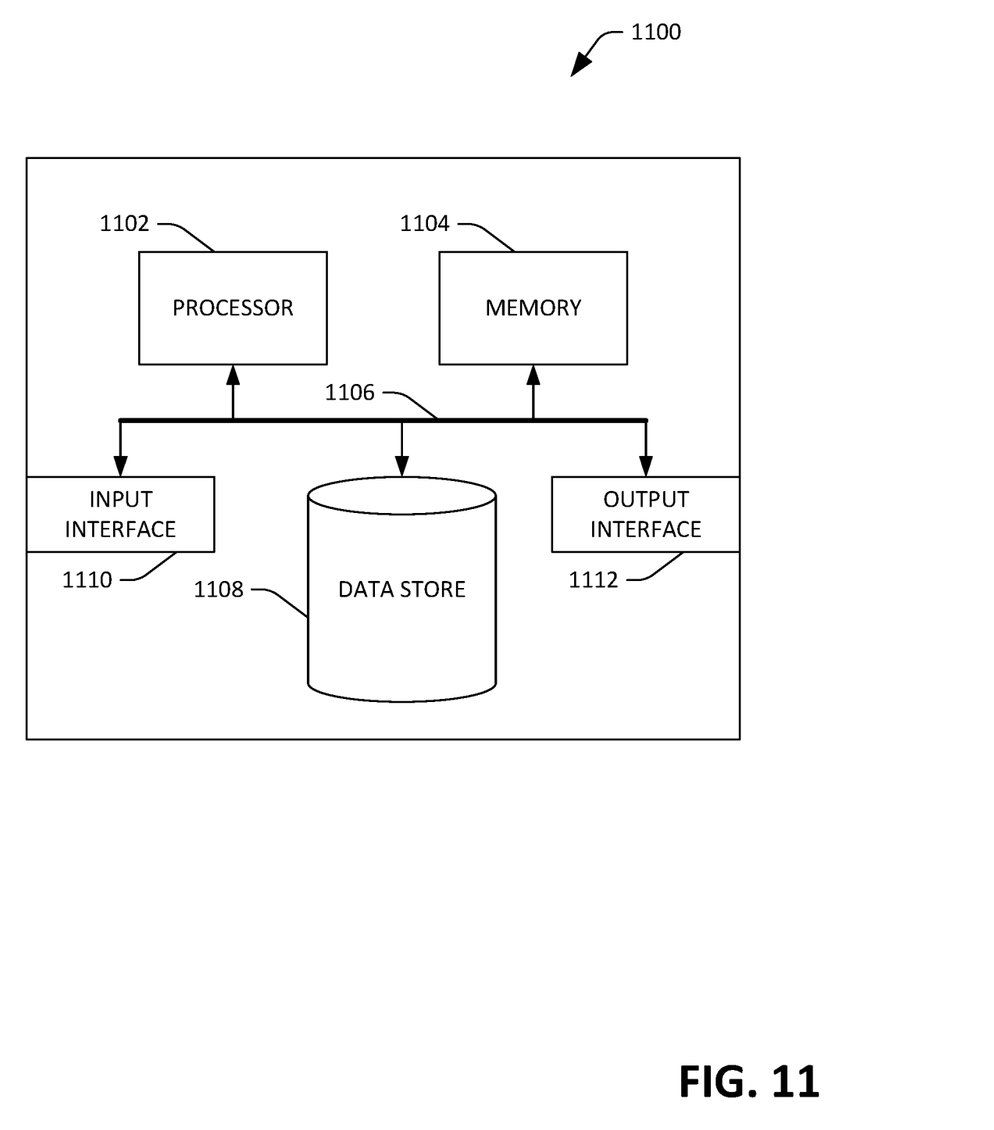
FIG. 11 is an exemplary computing system.

Referring now to FIG. 11, a high-level illustration of an exemplary computing device 1100 that can be used in accordance with the systems and methodologies disclosed herein is illustrated. For instance, the computing device 1100 may be used in a system that is configured to assign semantic labels that identify types of sections in documents. By way of another example, the computing device 1100 can be used in a system that performs tasks related to electronic document understanding. The computing device 1100 includes at least one processor 1102 that executes instructions that are stored in a memory 1104. The instructions may be, for instance, instructions for implementing functionality described as being carried out by one or more components discussed above or instructions for implementing one or more of the methods described above. The processor 1102 may access the memory 1104 by way of a system bus 1106. In addition to storing executable instructions, the memory 1104 may also store documents, images of documents, text.

The computing device 1100 additionally includes a data store 1108 that is accessible by the processor 1102 by way of the system bus 1106. The data store 1108 may include executable instructions, documents, images of documents, etc. The computing device 1100 also includes an input interface 1110 that allows external devices to communicate with the computing device 1100. For instance, the input interface 1110 may be used to receive instructions from an external computer device, from a user, etc. The computing device 1100 also includes an output interface 1112. that interfaces the computing device 1100 with one or more external devices. For example, the computing device 1100 may display text, images, etc. by way of the output interface 1112.

It is contemplated that the external devices that communicate with the computing device 1100 via the input interface 1110 and the output interface 1112 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1100 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1100 may be a distributed system. Thus, for instance, several devices may be in communication by way of a network connection and may collectively perform tasks described as being performed by the computing device 1100.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a processor; and
memory storing instructions that, when executed by the processor, cause the processor to perform acts comprising:
receiving an image of a document that includes several sections of different section types;
providing the image of the document as input to a first machine learning model, wherein the first machine learning model outputs a region in the image of the document and scores for the region based upon the image of the document, wherein the region encompasses a section in the several sections, wherein the section includes text, wherein the section is of a section type, and further wherein the scores are indicative of likelihoods that the section is of respective section types;
providing the region of the image, the scores, and features pertaining to the text as input to a second machine learning model, wherein a label is assigned to the region based upon output of the second machine learning model, and further wherein the label identifies the section type of the section from amongst several possible section types; and
performing an electronic document understanding task based upon the label assigned to the region.

2. The system of claim 1, wherein the electronic document understanding task is identification of a language of the document.

3. The system of claim 1, wherein the electronic document understanding task is summarization of the text included in the section.

4. The system of claim 1,
wherein the first machine learning model outputs a second region that is encompassed by the region, wherein the second region encompasses a second section that is included within the section, wherein the second region includes second text that is included within the text wherein the second machine learning model is provided with the second region and features pertaining to the second text as input, wherein the second machine learning model assigns a second label to the second region based upon the features pertaining to the second text, wherein the second region is assigned the label and the second label, and further wherein the electronic document understanding task is performed based upon the second label assigned to the second region.

5. The system of claim 1, wherein the first machine learning model is a fast recurrent convolutional neural network.

6. The system of claim 1, wherein the document is a webpage, the acts further comprising:
rendering the webpage; and
generating the image of the rendered webpage.

7. The system of claim 1, wherein the document is a portable document format (PDF) document.

8. The system of claim 1, the acts further comprising:
extracting values for features of the region from the image, wherein the second machine learning model assigns the label to the region based upon the values for the features extracted from the region.

9. The system of claim 8, wherein the values for the features of the region comprise at least one of:
a location of the region in the image;
font of text in the region;
size of text in the region; or
styling of text in the region.

10. The system of claim 1, the acts further comprising:
identifying a topic referenced in the text, wherein the topic of the image is provided as input to the second machine learning model, and further wherein the second machine learning model assigns the label to the region based upon the identified topic.

11. A method performed by a computing system, the method comprising:
receiving a document that includes a section, the section is of a section type, the section includes text;
generating an image of the received document;
providing the image of the received document to a first machine learning model as input, wherein the first machine learning model outputs a region in the image of the document and scores for the region based upon the image of the document, wherein the region encompasses a section in the several sections, wherein the section includes text, wherein the section is of a type, and further wherein the scores are indicative of likelihoods that the section is of respective section types;
providing the region of the image, the scores, and features pertaining to the text as input to a second machine learning model, wherein a label is assigned to the section based upon output of the second machine learning model, and further wherein the label indicates that the section is of the section type; and
performing an electronic document understanding task based upon the label assigned to the section.

12. The method of claim 11, wherein a second section is included in the first section, and further wherein the second section is also assigned the label.

13. The method of claim 12, wherein the second section does not overlap with the first section in the image.

14. The method of claim 11, wherein the electronic document understanding task is creation of a list, wherein the list includes the text.

15. The method of claim 11, further comprising:
generating a value for a feature of the section in the image, wherein the value is provided as input to the second machine learning model, and further wherein the output of the second machine learning model is based upon the value.

16. The method of claim 15, wherein the feature is location.

17. The method of claim 15, wherein the feature is size of text.

18. The method of claim 11, wherein the label indicates that the section includes primary content of the document.

19. The method of claim 11, wherein the document is a webpage, the method further comprising:
rendering the webpage; and
generating the image of the rendered webpage.

20. A non-transitory computer-readable storage medium comprising instructions that, when executed by a processor, cause the processor to perform acts comprising:

receiving a document, wherein the document includes several sections of differing types, and further wherein a section in the several sections comprises text;
generating an image of the received document;
providing the image as input to a first machine learning model, wherein the first machine learning model identifies a candidate region in the image, wherein the candidate region encompasses the section;
extracting the text from the candidate region in the image identified by the first machine learning model;
providing the candidate region and a feature value pertaining to the text extracted from the candidate region as input to a second machine learning model, wherein the second machine learning model generates an output based upon the candidate region and the feature value;
assigning a label to the candidate region based upon the output generated by the second machine learning model, wherein the label identifies a type of the section; and
performing an electronic document understanding task based upon the label assigned to the candidate region.

* * * * *